UNITED STATES PATENT OFFICE.

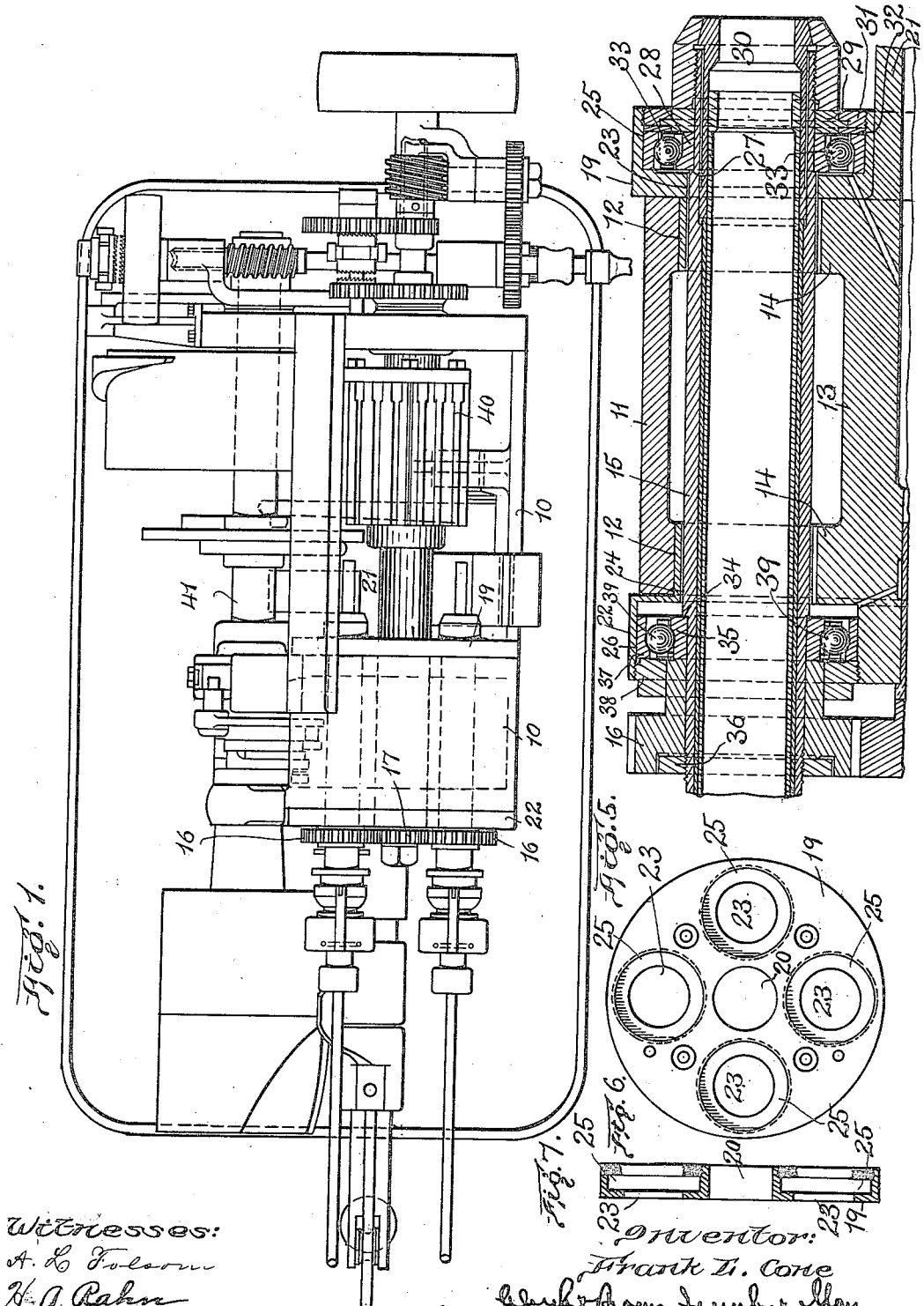

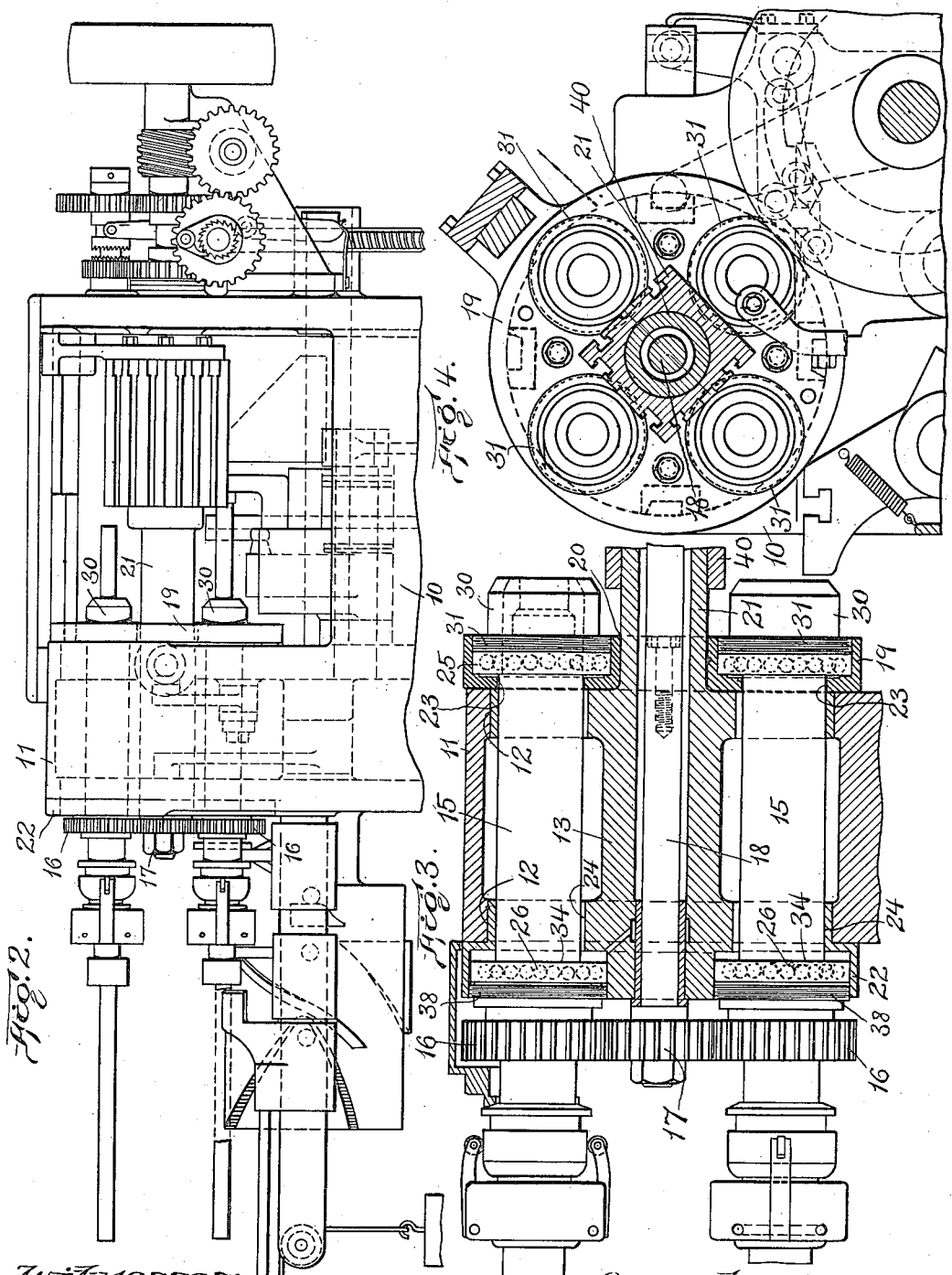

FRANK L. CONE, OF WINDSOR, VERMONT, ASSIGNOR TO WINDSOR MACHINE COMPANY, OF WINDSOR, VERMONT, A CORPORATION OF VERMONT.

SPINDLE-BEARING FOR MULTIPLE-SPINDLE METAL-WORKING MACHINES.

1,168,250.

Specification of Letters Patent. Patented Jan. 11, 1916.

Application filed February 8, 1915, Serial No. 6,878. Renewed November 30, 1915. Serial No. 64,385.

*To all whom it may concern:*

Be it known that I, FRANK L. CONE, a citizen of the United States, and resident of Windsor, in the county of Windsor and State of Vermont, have invented certain new and useful Improvements in Spindle-Bearings for Multiple-Spindle Metal-Working Machines, of which the following is a specification.

This invention has relation to metal-working machines of the multi-spindle type as illustrated, for example, in Letters Patent to George Otis Gridley, No. 904,866, dated November 24, 1908. In such machines, the work spindles are journaled in a turret which is mounted to rotate in a bearing on the main frame of the machine, so that the work spindles may be brought successively into proper relation to the tools which are to operate upon the work. The work spindles are generally rotated at various speeds according to the character of the cut to be made. It is of the greatest importance that these spindles should be so mounted and supported as to hold the work rigidly under the strains of the cut. These strains are either lateral, as in the operation of forming or cutting off, or longitudinal or endwise of the spindle, as in the case of drilling. In the turning operation, the strains are not only longitudinal or endwise of the spindle but also lateral, just as when two operations are being performed upon the work, like forming and drilling, in which event the spindle is called upon to resist both a lateral and an end thrust. These diverse strains and thrusts upon the spindle must be resisted by the bearings in which the spindles are mounted; and, when the spindles are mounted in the ordinary friction bearings, the latter soon become worn, allowing the work to yield and preventing a perfect operation. Moreover, the heat engendered by the friction causes the expansion of the bearings with the additional friction attendant thereupon. Machines of this general character, even when constructed for operating upon relatively small work, say 1¼″ diameter, are necessarily large, cumbersome and heavy. It is desirable, of course, that the bearings for the turret should be of relatively large diameter so as to be easily revolved and so as to resist lateral strains; but to make them larger than is required for this purpose increases the weight and cost of manufacture of the machine and consequently increases the cost to the ultimate user.

The object of the present invention is to provide a machine of this general character with anti-friction bearings for the spindles, without increasing the diameter of the main bearing for the turret, so as to reduce the friction of the rotating parts without materially increasing the size or weight of the machine.

A further object of the invention is to provide the machine with anti-friction bearings in which the lateral and endwise thrusts upon the spindle will be borne by separate bearings, thereby reducing the load upon each bearing. In this way the load is equalized between two bearings.

In accordance with the present invention, each of the work spindles is mounted in two separate bearings, and these bearings are located outside or beyond the ends of the main bearing on the main frame in which the turret is itself journaled. As a result of this arrangement I am able to employ anti-friction bearings which of necessity are of much greater diameter than the ordinary ball or friction bearings. These two bearings are thus separated a considerable distance, the bearing for the front end of the spindle being so constructed and arranged as to resist lateral or sidewise thrust upon the spindle, whereas the bearing for the rear end portion of the spindle is constructed and arranged to resist rearward end thrust, although it will in addition resist lateral thrust. In this connection it may be stated that the front end bearing is constructed and arranged to resist a forward end thrust of the spindle so that the two bearings hold the spindle against longitudinal or axial movement in either direction. In conjunction with the bearings, I provide means by which the adjustment of a single part will relatively adjust the spindle and both bearings, so as to compensate for wear and prevent either lateral or endwise vibration.

Referring to the accompanying drawings, which illustrate one embodiment of the invention: Figure 1 represents a plan view of a machine embodying the invention. Fig. 2 represents a front elevation of a portion of the same. Fig. 3 represents a section passing through the axis of the turret and through the axes of two diametrically opposite spindles. Fig. 4 represents a cross section taken through the tool holder. Fig. 5 represents an enlarged section through one of the spindles and the adjacent parts. Figs. 6 and 7 represent the bearing disk detached.

It will be unnecessary to describe the entire machine in detail, as in essential respects it may be substantially similar to that illustrated in the Letters Patent to George Otis Gridley hereinbefore referred to. I may state, however, that on the main frame is supported the spindle-carrying turret having an extension on which is mounted a sliding tool holder 40 which is reciprocated by suitable mechanism operated by a drum shaft 41. The turret to be described is indexed at proper intervals by an indexing mechanism, after which it is locked against rotation.

The main frame of the machine, which is indicated at 10, is formed with a circular bearing 11 to receive the turret in which is journaled the work spindles. The main bearing 11 is provided with the two internal separated bearing surfaces 12 and the turret consists of a hub 13 provided at or near its ends with the peripheral flanges 14 the peripheries of which register with the bearing surfaces 12 of the main bearing 11 on the main frame. Passing loosely through apertures in the flanges 14 of the turret are the work spindles which are indicated at 15. Each spindle is provided with any suitable form of stock-feeding mechanism, such for instance as that pointed out in the patent to George Otis Gridley to which reference has already been made. Each spindle has secured thereto a pinion 16 intermeshing with a gear 17 on a drive shaft 18 by which the rotation of the work spindles is secured.

At the front end of the turret there is a disk 19 which has a central aperture 20 to fit upon the turret extension 21, and which overlaps at its margin the turret bearing as shown in Fig. 3. This disk is secured by bolts or other suitable fastenings directly to the outer end face of the adjacent peripheral flange 14 of the turret. A similar disk may be separately formed and attached to the outer end face of the turret, but, as shown, the turret is formed with an extension and diametrical enlargement 22 integral therewith but otherwise corresponding to the disk 19 which near its periphery overlaps the turret bearing as shown in Figs. 3 and 5. In the two members 19 and 22 are formed apertures 23, 24, respectively, and cups 25, 26, through which the spindles loosely pass. These cups are of relatively large diameter. In said cups are placed ball bearings for the spindles. Referring to the bearings for the chuck ends of the spindles, it will be seen that the spindle has a shoulder 27 against which an inner ball race 28 is clamped by a flanged collar 29, loose on the spindle, and the chuck 30 screwed on to the end of the spindle. Fitted in said cup or socket is an outer ball race which is clamped against the inner face of the cup by a washer 32 engaged by the threaded collar 31. Between the two races are the balls 33 held apart by any suitable cage or separator, which need not be described. The outer and inner ball races are complementally curved, and offer no resistance to an endwise movement of the spindle to the left, but hold the spindle against lateral movement.

On the rear end of each spindle there is a shoulder 34 facing oppositely to that at 27, and abutting thereagainst is the ball race 35 which is held in place by the hub of the gear 16, which in turn is held against endwise movement of the spindle by a threaded collar 36 screwed on the spindle. In the cup 26 is placed a complemental race 37 against the end of which abuts the threaded adjustable collar 38 screwed into the cup; and between the races are the balls 39 held in a cage or separator. The races 35 and 37 resist the endwise rearward thrust of the spindle, but not a forward thrust thereof, and hold the rear end of the spindle against lateral vibration. By rotating the collar or adjusting member 38, the races of each pair may be adjusted longitudinally of the spindle toward and from each other, as will be readily understood from the foregoing description.

It will be noted that the ball bearings are large in diameter,—in fact very much larger than would be permitted were they located within the planes of the ends of the turret bearing. The balls are preferably each from an inch to an inch and a quarter in diameter, and the races are of sizes to correspond. It has heretofore been found impractical, in large and heavy metal-working machines, to use ball bearings for the spindles, and particularly in multi-spindle machines, as they soon became worn and injured under the heavy strains due to the cutting operations and caused inaccuracies in the finished work. By my construction and arrangement of parts, however, I have overcome all the difficulties which have prevented the successful use of such bearings, without increasing the diameter of the turret or the diameter or thickness of the turret bearing. By providing the removable ball-bearing receiving disk at one end of the turret, it is possible to insert the turret endwise into and remove it from its bearings. It is evident that said disk might be placed at either end of the turret. By the construction herein described, the rear end thrust of the spindle is borne solely by the rear ball bearing, and is not borne by the front ball bearing, yet both bearings securely hold the spindle against lateral thrusts at points which are relatively widely separated or remote. Forward thrusts, as when the stock is being fed or at other times, are resisted by the front end bearing.

Having thus explained the nature of my said invention and described a way of constructing and using the same, although without attempting to set forth all the forms in which it may be made or all the modes of its use, what I claim is:

1. In a multi-spindle metal-working machine, a frame having a turret bearing, a turret journaled in said bearing and having end extensions beyond said bearing, spindles passing through said turret, and ball bearings supported by said turret extensions and located substantially beyond the ends of the turret bearing.

2. In a multi-spindle metal-working machine, a frame having a turret bearing, a turret journaled in said bearing and having end extensions beyond said bearing and overlapping the same, said extensions having apertures and sockets, ball bearings located in said sockets beyond the ends of said turret bearing, and spindles journaled in said ball bearings.

3. In a multi-spindle metal-working machine, a frame having a turret bearing, a turret journaled in said bearing, end extensions or disks formed on or secured to the ends of the turret and lying beyond the ends of the turret bearing, ball bearings mounted in the front end extension and arranged to resist lateral thrusts of the spindles, ball bearings mounted in the rear end extension to resist rear end thrusts of the spindles, and spindles journaled in said ball bearings.

4. In a multi-spindle metal-working machine, a frame having a turret bearing, a turret journaled in said bearing and having end extensions beyond said bearing, spindles passing through said turret, ball bearings placed in cups or sockets formed in the outer faces of said end extensions beyond the ends of the turret bearings, and spindles journaled in said bearings.

5. In a multi-spindle metal-working machine, a frame having a turret bearing, a turret journaled in said bearing and having end extensions beyond said bearing, spindles passing through said turret, ball bearings for said spindles supported by said end extensions, and each comprising a pair of opposing ball races, one on the turret and the other on said extension, and balls between said races, and means, one for each spindle, for simultaneously adjusting the races of the bearings for such spindle.

In testimony whereof I have affixed my signature, in presence of two witnesses.

FRANK L. CONE.

Witnesses:
GEORGE O. GRIDLEY,
ISABEL R. GAMASH.